(12) United States Patent
Seremet

(10) Patent No.: US 10,129,423 B2
(45) Date of Patent: Nov. 13, 2018

(54) IMAGE SENSOR-BASED MEDIA TRACKING

(71) Applicant: NCR Corporation, Duluth, GA (US)

(72) Inventor: Slavko Seremet, Kitchener (CA)

(73) Assignee: NCR Corporation, Atlanta, GA (US)

( * ) Notice: Subject to any disclaimer, the term of this patent is extended or adjusted under 35 U.S.C. 154(b) by 52 days.

(21) Appl. No.: 15/337,588

(22) Filed: Oct. 28, 2016

(65) Prior Publication Data

US 2018/0124266 A1  May 3, 2018

(51) Int. Cl.
*H04N 1/04* (2006.01)
*H04N 1/00* (2006.01)
*G07D 11/00* (2006.01)

(52) U.S. Cl.
CPC ..... *H04N 1/00689* (2013.01); *G07D 11/0066* (2013.01); *H04N 1/00734* (2013.01); *H04N 1/00766* (2013.01); *H04N 1/00782* (2013.01)

(58) Field of Classification Search
CPC .............. H04N 1/00689; G07D 11/0066
USPC ............. 358/482, 483, 496, 474, 444, 505
See application file for complete search history.

(56) References Cited

U.S. PATENT DOCUMENTS

| | | | |
|---|---|---|---|
| 2005/0030597 A1* | 2/2005 | Benham | H04N 1/00681 358/495 |
| 2009/0324053 A1* | 12/2009 | Ross | G06K 9/2018 382/137 |
| 2014/0063563 A1* | 3/2014 | Tatsui | H04N 1/32358 358/444 |
| 2016/0300209 A1* | 10/2016 | Schreckenberg | G07D 11/0009 |

* cited by examiner

*Primary Examiner* — Cheukfan Lee
(74) *Attorney, Agent, or Firm* — Schwegman, Lundberg & Woessner

(57) ABSTRACT

A Contact Image Sensor (CIS) module in combination with a Field-Programmer Gate Array (FPGA) of an image device cooperate to identify, track, and record media document images for media documents being tracked within a valuable media depository/dispenser.

17 Claims, 6 Drawing Sheets

IMAGE SENSOR-BASED MEDIA TRACKING

BACKGROUND

Media handing devices that process media documents and bunches of media documents after separating the media documents for individual processing downstream within the media handling devices. Media handing devices include a variety of integrated components.

As the media document is processed through the media handling device, a variety of sensors are activated and deactivated to track movement of the media document and indicate where the media document is located along the transport pathway.

Typically, track sensors or photodiode (emitter) and phototransistor pairs, located on the same or opposing sides of the document track are activated before and/or after media handling components for purposes of transmitting a presence of media on the track as signals to integrated controllers within the media handling devices. These signals are then passed as they are captured from the sensors to the integrated controllers along bus connections for processing in some manner. The processing includes such things as: media document tracking, activating, and deactivating components (such as Contact Image Sensors (CISs) within the media handling device for receiving or ejecting the media document along the media transport pathway, and the like. The processing associated with assembling and manipulating the captured signals are performed remote from the imaging devices.

SUMMARY

In various embodiments, methods and a system for image sensor-based media tracking within a valuable media depository are provided.

According to an embodiment, a method for image sensor-based media tracking is presented. Specifically, and in one embodiment, a Field-Programmable Gate Array (FPGA) makes a determination based on averaged scanline data to initiate storage of scanlines of pixels received from an image sensor as portions of a document image. Next, the FPGA provides scanlines from onboard FPGA memory to an integrated microcontroller upon request by the microcontroller.

DETAILED DESCRIPTION

Figure 1A:
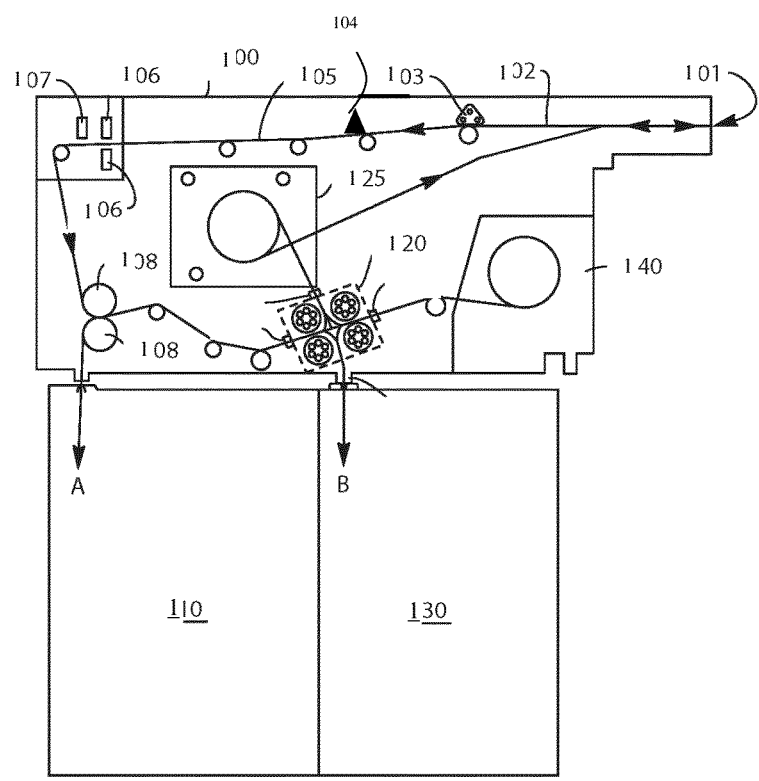
FIG. 1A is a diagram depicting a deposit module of a Self-Service Terminal (SST) having one or more imaging devices, according to an example embodiment.

FIG. 1A is a diagram depicting a one-sided view of a valuable media depository 100, according to an example embodiment (also referred to as a deposit module). It is to be noted that the valuable media depository is shown with only those components relevant to understanding what has been added and modified to a conventional depository for purposes of providing media tracking within one or more imaging devices integrated within the depository 100.

The depository 100 is suitable for use within an Automated Teller Machine (ATM), which can be utilized to process deposited banknotes and checks (valuable media as a mixed bunch if desired). The deposit module 100 has an access mouth 101 (media or document infeed) through which incoming checks and/or banknotes are deposited or outgoing checks and/or banknotes are dispensed. This mouth 101 is aligned with an infeed aperture in the fascia of the ATM in which the depository 100 is located, which thus provides an input/output slot to the customer. A bunch (stack) of one or more items (valuable media) is input or output. Incoming checks and/or banknotes follow a first transport path 102 away from the mouth 101 in a substantially horizontal direction from right to left shown in the FIG. 1A. They then pass through a novel separator module 103 and from the separator 103 to a deskew module 104 along another pathway portion 105, which is also substantially horizontal and right to left. The items are now deskewed and aligned for reading by imaging cameras 106 (comprising novel imaging devices as discussed herein and below in greater detail with the FIGS. 1B-1C and 2-4) and a Magnetic Ink Character Recognition (MICR) reader 107.

Items are then directed substantially vertically downwards to a point between two nip rollers 108. These nip rollers cooperate and are rotated in opposite directions with respect to each other to either draw deposited checks and/or banknotes inwards (and urge those checks and/or banknotes towards the right hand side in the FIG. 1A), or during another mode of operation, the rollers can be rotated in an opposite fashion to direct processed checks and/or banknotes downwards in the direction shown by arrow A in the FIG. 1A into a check or banknote bin 110. Incoming checks and/or banknotes, which are moved by the nip rollers 108 towards the right, enter a diverter mechanism 120. The diverter mechanism 120 can either divert the incoming checks and/or banknotes upwards (in the FIG. 1A) into a re-buncher unit 125, or downwards in the direction of arrow B in the FIG. 1A into a cash bin 130, or to the right hand side shown in the FIG. 1A into an escrow 140. Items of media from the escrow 140 can selectively be removed from the drum and re-processed after temporary storage. This results in items of media moving from the escrow 140 towards the left hand side of the FIG. 1A where again they will enter the diverter mechanism 120. The diverter mechanism 120 can be utilized to allow the transported checks (a type of valuable media/document) and/or banknotes (another type of valuable media/document) to move substantially unimpeded towards the left hand side and thus the nip rollers 108 or upwards towards the re-buncher 125. Currency notes from the escrow can be directed to the re-buncher 125 or downwards into the banknote bin 130.

As used herein, the phrase "valuable media" refers to media of value, such as currency, coupons, checks, negotiable instruments, value tickets, and the like.

For purposes of the discussions that follow with respect to the FIGS. 1A-1B and 2-3, "valuable media" is referred to as currency (currency note and/or check) and the "valuable media depository" is referred to as a "depository." Additionally, valuable media may be referred to as a "document" and/or "media document" herein.

Figure 1B:
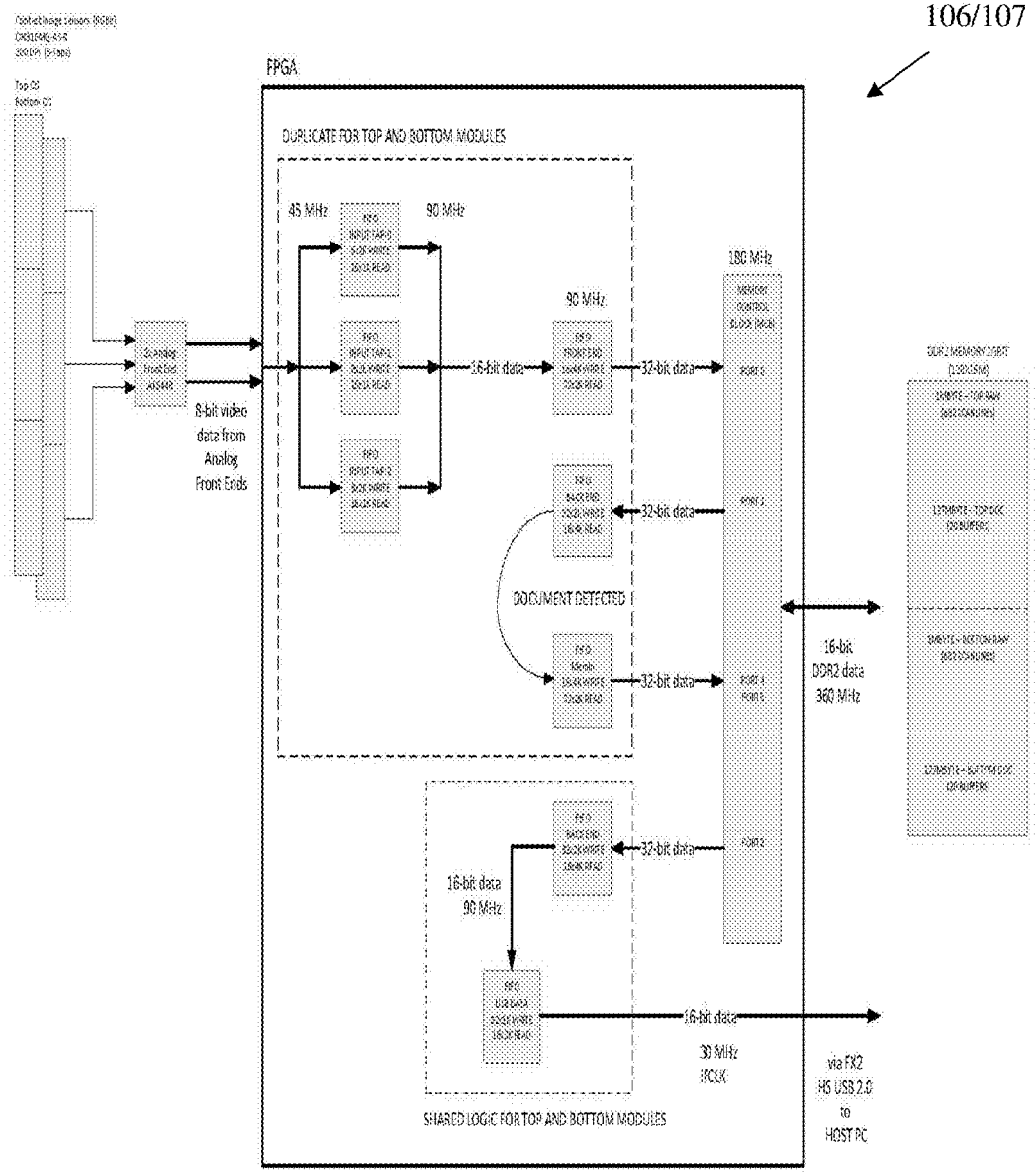
FIG. 1B is a diagram depicting hardware components of an imaging device, according to an example embodiment.

FIG. 1B is a diagram depicting hardware components of an imaging device 106/107, according to an example embodiment.

With embodiments presented herein and below, the conventional track sensor function is integrated into a CIS module and a Field Programmable Gate Array (FPGA) and controlled by an integrated processor.

The imaging device 106/107 includes a camera circuit card having a microprocessor, a Field Programming Gate Array (FPGA) having internal memory, and onboard memory to the FPGA. The imaging device 106/107 controls one or more Contact Image Sensor (CIS) modules across a Flat Flex Cable connection. The microprocessor of the imaging device 106/107 is interfaced through a Universal Serial Bus (USB) connection or other bus connection to a host controller (PC or Digital Signal Processing (DSP) device) for the depository 100; the host controller managing componentry and media document processing through the depository 100.

As used here, "document detection" means that some portion of a media document is located directly underneath/above a CIS module within a valuable media depository/dispenser.

In a conventional approach, the microprocessor of the conventional imaging device instructs the FPGA to start scanning a media document after the microprocessor receives information that a leading edge of a media document has been detected by a phototransistor-based circuit. The media document is detected by the phototransistor circuit as the document travels across the track of pathway 105 at a media document speed configured for the depository 100. The captured pixels by the CIS modules for the document are output in parallel across 3 to 6 taps and transmitted to an analogue-to-digital converter interfaced between the CIS modules and the FPGA. The FPGA rearranges the received data into scanlines in memory. The integrated microcontroller commands the FPGA to transferred the captured image (numerous scanlines long to the microcontroller). The microcontroller then sends the scanlines comprising the media document image to the host PC of the depository. With this approach, single document images are handled by the FPGA on a per document bases and the integrated microcontroller of the imaging device tracks and counts the document images being detected.

With the new approach, the integrated microcontroller of the imaging device activates the CIS modules on depository 100 during power-up or boot when no document is present to acquire an image baseline for the back of the track for pathway at 106, the pixel values across one or more taps are averaged to obtain a baseline average pixel value when no document is present on the track. Next, when the microcontroller commands the FPGA to start document detection, the FPGA compares live scanline pixel values (averaged across one or more taps) against the baseline average. When the FPGA detects an average line (tap) of pixel values that exceeds the baseline value by a programmed amount (margin), then a media document is deemed to be present by the FPGA and full image capture begins, with the scanlines for the image retained in onboard FPGA memory along with some pre-configured or programmed offset amount of scanline data leading up to detection of the leading edge of the document. This ensures the entire document image is captured, even when the document enters the zone of the pathway having the CIS modules 106 in a skewed fashion.

More specifically, with the approaches presented herein and below. The FPGA makes a determination when to start retaining scanlines in external memory as being a document image after inspecting taps (rearranged to scanlines) returned from the CIS modules; rather, than being instructed by the microcontroller to start scanning and providing scanlines for a detected document. The FPGA is configured for how many back-of-track scanlines to retain before the leading edge of the document and is configured for how many scanlines in total to capture as part of an image for a document. The FPGA utilizes a circular data buffer to retain scanlines until the document is completely detected, after which document image storage to the onboard FPGA memory is initiated. Only a small portion of available onboard DDR2 memory is used as the circular scanline buffer with the remaining onboard memory being reserved for storage of document image scanlines. The microprocessor (microcontroller) of the imaging device periodically polls the FPGA to find out how many documents are available for retrieval and the FPGA extracts the images from the onboard memory and provides to the microcontroller for transmission to the host PC of the depository 100. Conventionally, this was not the process where conventionally, the microprocessor serially tracked the number of scanned documents and as each document image was received through the scanlines and serially returned from the FPGA to the microcontroller. Conversely, with embodiments presented herein, media tracking is provided though the CIS modules and FPGA utilizing the onboard FPGA memory, which provides for improved processing throughout and image transmission within the imaging device. Additionally, the phototransistor based circuit traditionally located just before the CIS modules for identifying the presence of a document can be removed and become redundant pieces of hardware that are not necessary in the depositories/dispensers architectures with the teachings presented herein (thereby providing cost savings).

Figure 1C:
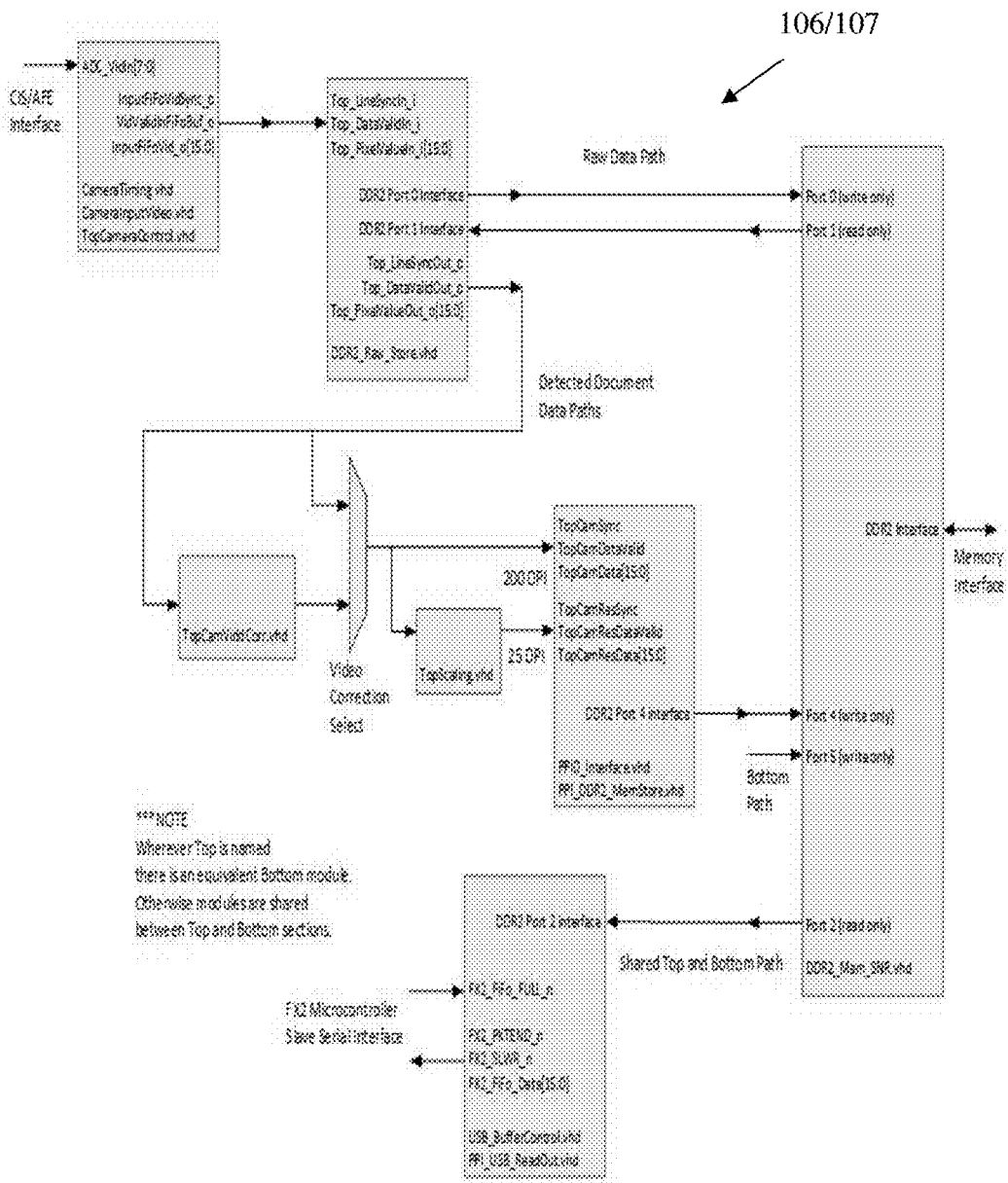
FIG. 1C is a diagram depicting FPGA processing for image sensor-based media tracking, according to an example embodiment.

The new approach to media tracking through an imaging device utilizing CIS modules, the FPGA, and onboard FPGA memory is implemented as an FPGA algorithm programmed as firmware into memory of the FPGA and depicted in the FIG. 1C.

FIG. 1C is a diagram depicting processing for image sensor-based media tracking within an imaging device 106/107, according to an example embodiment.

The FIG. 1C illustrates pseudo code and modules of the FPGA for performing the media tracking by the CIS modules, the FPGA, and the FPGA onboard memory. The onboard memory are registers within the FPGA. Once the microcontroller has instructed the FPGA to begin document detection and document image capture, the FPGA averages the pixel values received by a particular scanline (such as the scanline pixels received from the middle of three tap CIS architecture) from the CIS module and compares that average against the baseline average value for pixels for a same scanline taken when no document was present (back-of-track with no document present scanline baseline value) and when the acquired scanline pixel averaged value exceeds by some predefined margin above the baseline value, the FPGA knows that some configured number of previously acquired scanlines (scanlines that preceded the leading document edge detection) retained in the circular memory portion of the onboard memory along with a configured number of additional scanlines are needed to form all the portions of the document image (including, perhaps, a configurable number of back-of-track scanlines following detection of a trailing edge of the document), those scanlines that provide the document image are moved to the reserved portion of the onboard memory and the FPGA continues document tracking and detection for a next document. When the FPGA detects the leading edge of the document, a document detect flag is set, which triggers the FPGA to begin storage of the appropriate scanlines returned from the CIS module and available in memory to the reserved portion of the onboard FPGA memory. The microcontroller is regularly polling the FPGA for any detected documents and when such document images exists, the microcontroller instructs the FPGA to provide the scanlines for the documents back to the microcontroller. The microcontroller then sends the scanlines to the host PC for image processing with respect to the detected documents. In an embodiment, the set document detect flag set by the FPGA on detection of a leading document edge can also be used to notify the microcontroller of an available document image recorded in the onboard FPGA memory.

It is to be noted that the pathway 105 can include top and bottom opposing imaging devices 106/107. Each of the opposing imaging devices 106/107 include the architecture and FPGA processing as discussed above. Moreover, the pathway 105 may include a single bottom imaging device 106/107 or a single top imaging device 106/107.

In an embodiment, a plurality of CIS modules or a single CIS module is present in the imaging device 106/107 to capture different characteristics of the captured pixels in Red/Blue/Green/Black (Grey scale).

In an embodiment, each scanline includes a plurality of header information, such as but not limited to: color value, scanline number, resolution (e.g., red 200 DPI), and the like. The header information can be processed as needed by the host PC to assemble a particular document image of interest or a combination of colors to produce an image of interest (e.g., grey scale by combining red, green, and blue pixel values).

It is to be noted that all the image sensor-based media tracking discussed above is provided within the context of a valuable media depository, the image sensor-based media tracking can also be deployed and utilized within a valuable media dispensers or a combination valuable media depository/dispenser.

These and other embodiments are now discussed with reference to the FIGS. 2-4.

Figure 2:
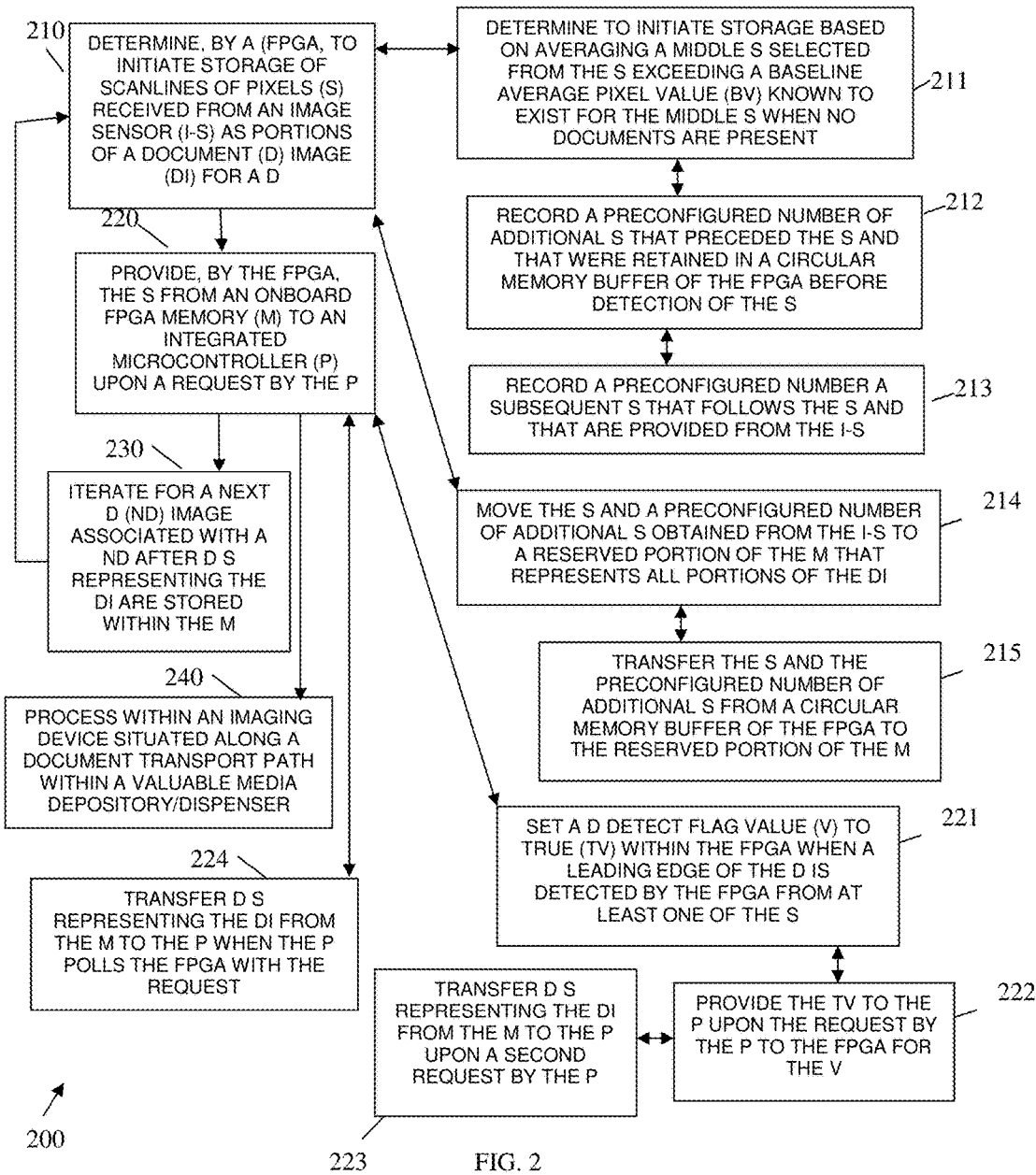
FIG. 2 is a diagram of a method for image sensor-based media tracking, according to an example embodiment.

FIG. 2 is a diagram of a method 200 for image sensor-based media tracking within an imaging device of a valuable media depository, according to an example embodiment. The method 200 when processed controls operation for a FPGA hardware module integrated into a valuable media depository/dispenser. The method 200 is implemented as executable instructions representing one or more firmware/software modules referred to as an "FPGA controller." The instructions reside in a non-transitory computer-readable medium and are executed by one or more processors of the valuable media depository.

In an embodiment, the valuable media depository/dispenser is the depository 100 of the FIG. 1A.

In an embodiment, the valuable media depository/dispenser is a recycler module.

In an embodiment, the valuable media depository/dispenser is a peripheral device integrated into a Self-Service Terminal (SST). In an embodiment, the SST is an ATM. In an embodiment, the SST is a kiosk.

In an embodiment, the valuable media depository/dispenser is a peripheral device integrated into a Point-Of-Sale (POS) terminal operated by a clerk.

In an embodiment, the FPGA controller is executed as firmware programmed instructions in memory of a FPGA for an imaging device. In an embodiment, the imaging device is a camera. In an embodiment, the imaging device is a scanner. In an embodiment, the imaging device is a combination scanner and camera.

In an embodiment, the FPGA controller performs, inter alia, the processing discussed above with the FIGS. 1B-1C.

At 210, the FPGA controller determines to initiate storage of scanlines of pixels received from an image sensor (such as an image sensor of a CIS module) as portions of a document image for a document are imaged by the image sensor and triggered for imaging based on a leading edge of the document tripping the image sensor to take the scanlines of pixels.

According to an embodiment, at 211, the FPGA controller determines to initiate the storage of the scanlines based on averaging a selected middle scanline's pixel values selected from the scanlines received from the image sensor, where the average value for the pixels values of the selected middle scanline exceeds a baselined average pixel value that is configured and known to the FPGA controller to be an image of a back-of-track without any documents being present.

In an embodiment of 211 and at 212, the FPGA controller records a preconfigured number of additional scanlines that preceded the scanlines and that were retained in a circular memory buffer of the FPGA before detection of the scanlines representing the presence of the document. That is, a preconfigured number of pixel scanlines housed in the circular memory buffer showing at least some of the back-of-track are acquired as part of the document scanlines that form an image of the document. This accounts for a document that is on the pathway of the media depository/dispenser and oriented in a skewed manner on the track of the pathway.

In an embodiment of 212 and at 213, the FPGA controller records a preconfigured number of subsequent scanlines (received from the image sensor) that follows the scanlines detected at 210. This allows for capturing all document scanlines including a preconfigured of trailing edge scanlines that include the back of track.

In an embodiment, at 214, the FPGA controller moves the scanlines and preconfigured number of additional scanlines obtained from the image sensor to a reserved portion of the onboard FPGA memory to represent all portions of the document image for the document present on the track of the media depository/dispenser.

In an embodiment of 214 and at 215, the FPGA controller transfers the scanlines and the preconfigured number of additional scanlines from a circular memory buffer portion of the onboard FPGA memory to the reserved portion of the onboard FPGA memory. This is done so that when a next document is detected by the FPGA controller as being present on the track of the media depository/dispenser, the scanlines for the document image are not overwritten and used in the circular memory buffer portion of the onboard FPGA memory.

At 220, the FPGA controller provides the scanlines from an onboard FPGA memory to an integrated microcontroller/microprocessor upon request made by the microcontroller. The microcontroller integrated into the imaging device with the FPGA on an imaging circuit card representing the imaging device.

According to an embodiment, at 221, the FPGA controller sets a document detect flag value to true within the FPGA when a leading edge of the document is detected by the FPGA controller as being present from at least one of the scanlines received from the image sensor.

In an embodiment of 221 and at 222, the FPGA controller provides the true value to the microcontroller upon the FPGA controller receiving the request for the document detect flag value from the microcontroller.

In an embodiment of 222 and at 223, the FPGA controller transfers the document scanlines representing the document image for the document to the processor upon a second request made by the microcontroller. Here, the first request by the microcontroller being for the document detect flag value and the second request being for the FPGA controller to provide the document scanlines from the onboard FPGA memory.

In an embodiment, at 224, the FPGA controller transfers the document scanlines representing the document image from the onboard FPGA memory to the microcontroller when the microcontroller polls the FPGA controller with the request for a document image.

According to an embodiment, at 230, the FPGA controller iterates back to 210 for a next document image associated with a next document after having stored the document scanlines for the document image of the original detected document within the onboard FPGA memory.

In an embodiment, at 240, the FPGA controller processes within an FPGA integrated into an imaging device (camera, scanner, a combination scanner/camera) and situated along a document transport path within a valuable media depository/dispenser.

Figure 3:
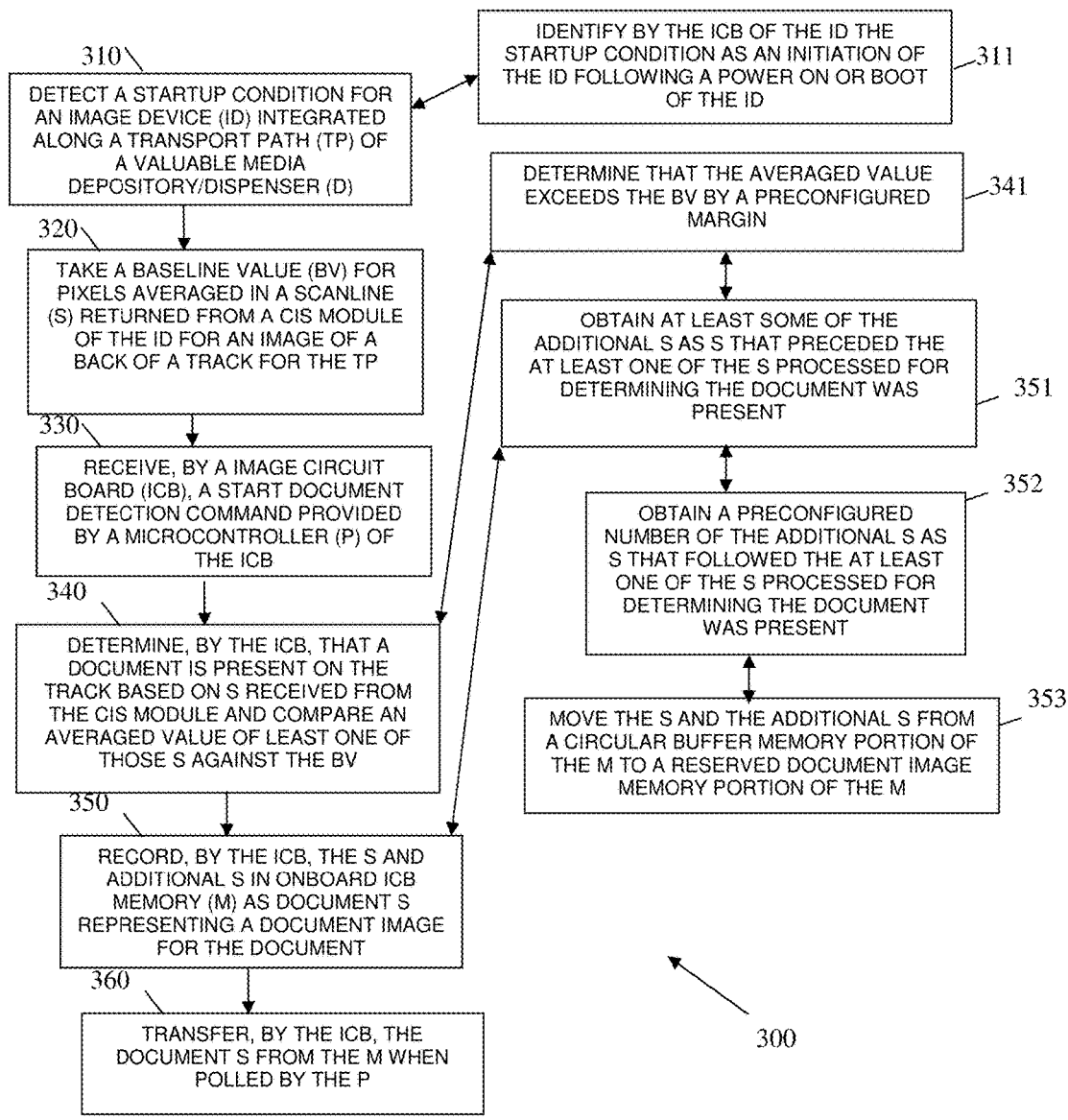
FIG. 3 is a diagram of another method for image sensor-based media tracking, according to an example embodiment.

FIG. 3 is a diagram of another method 300 for image sensor-based media tracking within an imaging device of a valuable media depository/dispenser, according to an example embodiment. The method 300 when processed controls operation for an image circuit board integrated into a valuable media depository/dispenser. The method 300 is implemented as executable instructions representing one or more firmware/software modules referred to as an "circuit board document tracker." The instructions reside in a non-transitory computer-readable medium and are executed by one or more processors of the valuable media depository.

In an embodiment, the valuable media depository/dispenser is the depository 100 of the FIG. 1A.

In an embodiment, the valuable media depository/dispenser is a recycler module.

In an embodiment, the valuable media depository/dispenser is a peripheral device integrated into a Self-Service Terminal (SST). In an embodiment, the SST is an ATM. In an embodiment, the SST is a kiosk.

In an embodiment, the valuable media depository/dispenser is a peripheral device integrated into a Point-Of-Sale (POS) terminal operated by a clerk.

In an embodiment, the circuit board document tracker is executed as firmware programmed instructions in memory of an image circuit board for an imaging device. In an embodiment, the imaging device is a camera. In an embodiment, the imaging device is a scanner. In an embodiment, the imaging device is a combination scanner and camera.

In an embodiment, the circuit board document tracker performs, inter alia, the processing discussed above with the FIGS. 1B-1C and 2.

In an embodiment, the circuit board document tracker is any Application-Specific Integrated Circuit (ASIC) programmed to interface with a CIS module as discussed herein.

In an embodiment, the circuit board document tracker is any controller programmed to interface with a CIS module as discussed herein.

At 310, the circuit board document tracker detects a startup condition for an image device integrated along a transport path of a valuable media depository/dispenser.

In an embodiment, at 311, the circuit board document tracker identifies the startup condition as an initiation of the imaging device that follows an imaging device power on or boot processing of the imaging device.

At 320, the circuit board document tracker takes a baseline value for pixels averaged in a scanline from a CIS module of the imaging device for an image of a back-of-track for the transport path when no document is present on the transport path.

At 330, the circuit board document tracker receives a start document detection command that is provided by an integrated microcontroller of the imaging device.

At 340, the circuitry document tracker determines that a document is present on the track based on scanlines received from the CIS module and comparing an averaged value for pixel values in at least one of those scanlines against the baseline value.

According to an embodiment, at 341, the circuit board document tracker determines that the averaged value exceeds the baseline value by a preconfigured margin (indicating to the circuit document tracker a leading edge of the document being present on the transport path).

At 350, the circuit board document tracker records the scanlines and additional scanlines in an onboard circuit board memory as document scanlines represent a document image for the document.

In an embodiment of 341 and 350, at 351, the circuit board document tracker obtains at least some of the additional scanlines that preceded the at least one of the scanlines processed for determining that the document was present on the transport pathway.

In an embodiment of 351 and at 352, the circuit board document tracker obtains a preconfigured number of the additional scanlines that followed the at least one scanline processed for determining that the document was present on the transport path.

In an embodiment of 352 and at 353, the circuit board document tracker moves the scanlines and the additional scanlines from a circular memory buffer portion of the onboard circuit board memory to a reserved document image memory portion of the onboard circuit board memory.

At 360, the circuit board document tracker transfers the document scanlines representing the document image for the document from the onboard circuit board memory when polled by the microcontroller for any available document images.

Figure 4:
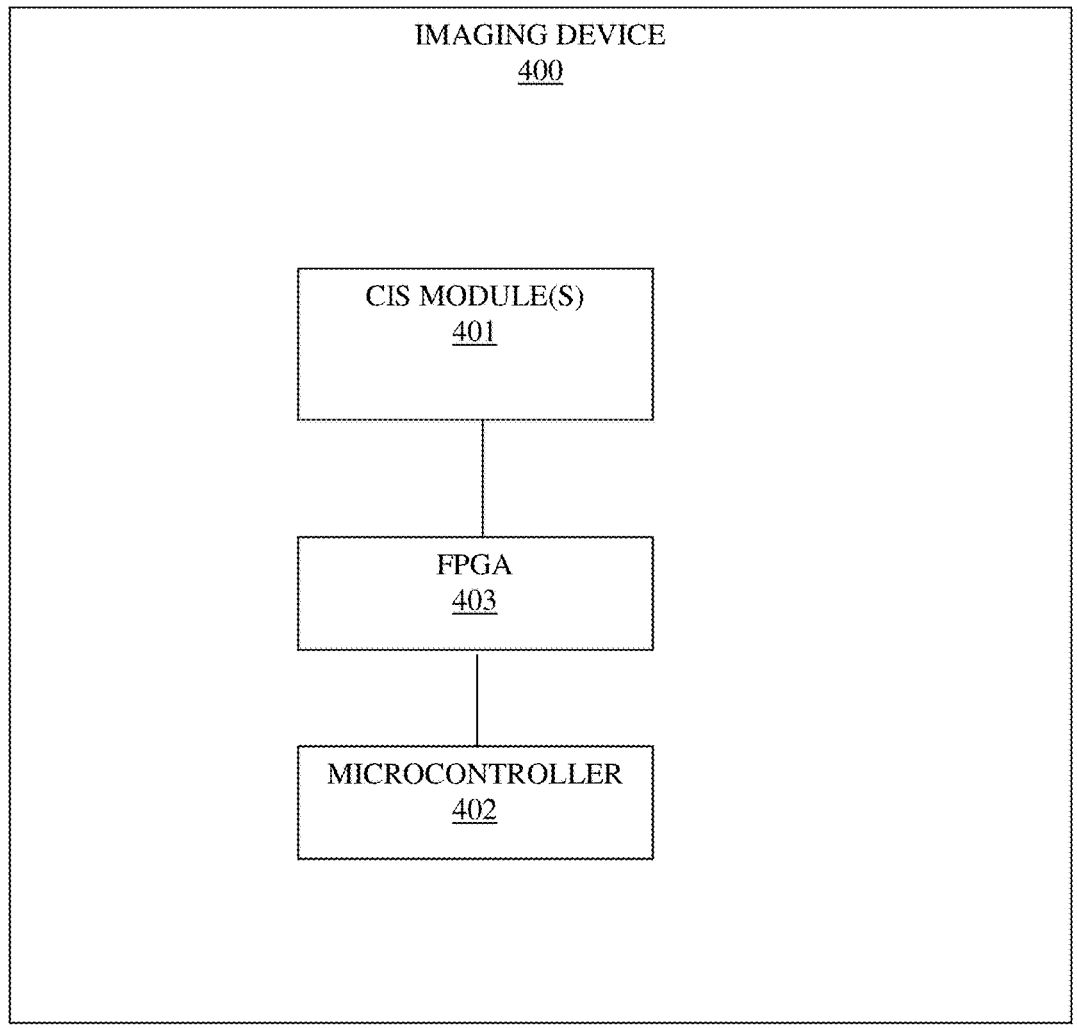
FIG. 4 is a diagram of a valuable media depository, according to an example embodiment.

FIG. 4 is a diagram of an imaging device 400, according to an example embodiment. The imaging device 400 records and processes scanlines of pixels for document images using a variety of mechanical, electrical, and software/firmware components, some of which were discussed above with reference to the FIGS. 1A-1C and the FIGS. 2-3.

In an embodiment, the imaging device 400 is the imaging device is any of or some combination of the imaging devices discussed above with reference to the FIGS. 1A-1C and 2-3.

The imaging device 400 includes one or more CIS modules 401, an integrated microcontroller 402 and a programmed FPGA 403.

The CIS modules 401 are interfaced to the FPGA 403 and the FPGA 403 interfaced to the microcontroller 402.

The FPGA 403 is configured and programmed to: i) initiate document detection upon a first instruction from the microcontroller 402, ii) detect a start of a document image for a document based on first scanlines of pixel values provided by the CIS module 401, which is independent of any instruction from the microcontroller 402, iii) record first scanlines and second scanlines provided by the CIS module 401 as document scanlines for the document image in an onboard FPGA memory, and iv) provide the document scanlines from the onboard FPGA memory upon a second instruction from the microcontroller 402.

In an embodiment, the imaging device 400 is situated along a track of a media transport pathway of a valuable media depository/dispenser as a document tracker. In an embodiment, the microcontroller 402 is interfaced to a host controller/PC/DSP device of a valuable media depository/dispenser through a USB connection. In an embodiment, the valuable media depository/dispenser is the valuable media depository 100 of the FIG. 1A.

In an embodiment, the FPGA 403 is any of the FPGAs discussed above with the FIGS. 1B-1C and 2-3.

In an embodiment, the imaging device 400 is a camera.

In an embodiment, the imaging device 400 is a scanner.

In an embodiment, the imaging device 400 is a combination scanner and camera.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   determining, by a Field-Programmable Gate Array (FPGA), to initiate storage of scanlines of pixels received from an image sensor as portions of a document image for a document, wherein determining further includes determining to initiate storage based on averaging a middle scanline of pixel values selected from the scanlines of pixels exceeding a baseline average pixel value known to exist for the middle scanline when no documents are present; and
   providing, by the FPGA, the scanlines from an onboard FPGA memory to an integrated microcontroller upon a request by the microcontroller.

2. The method of claim 1, wherein determining further includes recording a preconfigured number of additional scanlines of pixels that preceded the scanlines and that were retained in a circular memory buffer of the FPGA before detection of the scanlines.

3. The method of claim 2, wherein recording further includes recording a preconfigured number a subsequent scanlines of pixels that follows the scanlines and that are provided from the image sensor.

4. The method of claim 1, wherein determining further includes moving the scanlines and a preconfigured number of additional scanlines obtained from the image sensor to a reserved portion of the onboard FPGA memory that represents all portions of the document image.

5. The method of claim 4, wherein moving further includes transferring the scanlines and the preconfigured number of additional scanlines from a circular memory buffer of the FPGA to the reserved portion of the onboard FPGA memory.

6. The method of claim 1, wherein determining further includes setting a document detect flag value to true within the FPGA when a leading edge of the document is detected by the FPGA from at least one of the scanlines.

7. The method of claim 6, wherein providing further includes providing the true value to the microcontroller upon the request by the microcontroller to the FPGA for the document detect flag value.

8. The method of claim 6, wherein providing further includes transferring document scanlines representing the document image from the onboard FPGA memory to the microcontroller upon a second request by the microcontroller.

9. The method of claim 1, wherein providing further includes transferring document scanlines representing the document image from the onboard FPGA memory to the microcontroller when the microcontroller polls the FPGA with the request.

10. The method of claim 1 further comprising, iterating the method for a next document image associated with a next document after document scanlines representing the document image are stored within the onboard FPGA memory.

11. The method of claim 1, further comprising processing the method within an imaging device situated along a document transport path within a valuable media depository/dispenser.

12. A method, comprising:
   (i) detecting a startup condition for an image device integrated along a transport path of a valuable media depository/dispenser;
   (ii) taking a baseline value for pixels averaged in a scanline returned from a Contact Image Sensor (CIS) module for an image of a back of a track for the transport path;
   (iii) receiving, by an image circuit board, a start document detection command provided by a microcontroller of the image circuit board;
   (iv) determining, by the image circuit board, that a document is present on the track based on scanlines received from the CIS module and comparing an averaged value of at least one of those scanlines against the baseline value;
   (v) recording, by the image circuit board, the scanlines and additional scanlines in onboard image circuit board memory as document scanlines representing a document image for the document; and
   (vi) transferring, by the image circuit board, the document scanlines from the onboard image circuit board memory when polled by the microcontroller.

13. The method of claim 12, wherein (i) further includes identifying by the image circuit board of the image device the startup condition as an initiation of the image device following a power on or boot of the image device.

14. The method of claim 12, wherein (iv) further includes determining that the averaged value exceeds the baseline value by a preconfigured margin.

15. The method of claim 14, wherein (v) further includes obtaining at least some of the additional scanlines as scanlines that preceded the at least one of the scanlines processed for determining the document was present.

16. The method of claim 15, wherein obtaining further includes obtaining a preconfigured number of the additional scanlines as scanlines that followed the at least one of the scanlines processed for determining the document was present.

17. The method of claim 16, wherein obtaining further includes moving the scanlines and the additional scanlines from a circular buffer memory portion of the onboard image circuit board memory to a reserved document image memory portion of the onboard image circuit board memory.

* * * * *